United States Patent [19]

Roberts et al.

[11] 4,215,827

[45] Aug. 5, 1980

[54] FILM LOOP APPARATUS

[76] Inventors: Marvin A. Roberts, 4111 Mourning Dove Way, Calabasas, Calif. 91302; Joseph C. Wary, 15222 Rayen St., Apt. 2, Sepulveda, Calif. 91402

[21] Appl. No.: 51,827

[22] Filed: Jun. 25, 1979

[51] Int. Cl.² .................... B65H 75/00; B65H 17/42
[52] U.S. Cl. .................................. 242/55.01; 226/118
[58] Field of Search ............................ 242/55.01, 47.5; 226/118, 119, 189

[56] References Cited

U.S. PATENT DOCUMENTS

| | | | |
|---|---|---|---|
| 3,369,765 | 2/1968 | Jensen | 242/55.01 |
| 3,532,282 | 10/1970 | Wolff | 242/55.01 |
| 3,695,534 | 10/1972 | Treise | 242/55.01 |
| 3,827,646 | 8/1974 | Nielsen | 242/55.01 |

Primary Examiner—Edward J. McCarthy
Attorney, Agent, or Firm—Roger A. Marrs

[57] ABSTRACT

An apparatus is described herein which when used in conjunction with a continuous film duplicator or printer, stores and transports micrographic, motion picture, and other masters during the printing cycle to eliminate rewinding when making multiple duplicate copies. The apparatus is modular utilizing a pair of carriages so that it may be expanded either horizontally or vertically to accommodate more footage. A single motor is employed to adjust the spacing between top and bottom roller sets disposed on the carriages for various lengths of film while a three-position sensor arm controls the motor. A slack sensor controls the speed of rollers mounted on shafts on the carriages and a motor drives each shaft controlled by the sensor. Low-mass plastic film rollers equipped with soft-touch rubber surfaces are employed for transporting the film and low inertia PM motors provide high acceleration and torque for driving the shafts. A transparent enclosure houses the above mechanisms and film that travels through the enclosure and suitable electronic circuitry is provided for sensing, driving, and controlling the various functions while operating at speeds up to and exceeding 1500 ft/min.

11 Claims, 9 Drawing Figures

FILM LOOP APPARATUS

BACKGROUND OF THE INVENTION

1. Field of the Invention

This invention relates to film loop take-up mechanisms and more particularly to a novel film loop apparatus having positive demand drive and associated sensors therefor for transport-in-storage of a continuous film loop external to a film printer.

2. Brief Description of the Prior Art

To increase the efficiency of printing multiple copies of motion pictures, microfilm, and other photographic masters onto photographic duplicating film, a device is needed to transport-in-storage all of the continuous-web loop external to the printer. Typically, in the past, rollers were mounted in pairs on a panel and the film looped over the rollers in a seesaw pattern and then back to the printer. More recently loop cabinets have been produced with multiple shafts, each carrying numerous rollers. The film traveled from the printer to the cabinet, and was threaded in loops around top and bottom roller pairs, first across the first pair of shafts, then across the second, and so on until the cabinet was filled or all of the film was stored. To accommodate for various film lengths, the upper shafts mounting the rollers were fixed at the top of the cabinet and were all driven by a common motor. The lower shafts were mounted in a frame. A means was provided to adjust the space between upper and lower rollers by raising or lowering the lower frame. Sometimes this was done with the aid of springs, weights, or levers; and sometimes by a manually-controlled motor.

To assist in film transport through the cabinet, the metal rollers were mounted on roller bearings. A motor turned all shafts on the top frame in the direction of film travel. The turning shafts caused the rollers to lose their resistance to being turned by the moving film passing over them. Without this aid, film tension would become too great and the film would break.

Equipment of the type described above is currently in common use throughout photographic and motion picture laboratories. However, there are numerous drawbacks to the loop cabinets now in use. For example, loading the cabinet presents problems because all roller shafts are motorized from a single motor and individual shafts cannot vary their speeds to take up more film when film length is increased or decreased. In addition, since the rollers are metal, they have a great deal of inertia and cannot rapidly change speed to match start and stop acceleration and deceleration. Further, since the rollers are not driven, slack accumulates quickly, and the operator must manually make adjustments, and sometimes move the cabinet closer to or further from the printer to compensate for film length changes. In addition, present loop cabinets have a maximum capacity often less than the length of the master to be accommodated. All of these factors contribute to limiting the throughput of the printer, thereby reducing the production efficiency of the laboratory.

SUMMARY OF THE INVENTION

The above problems and difficulties are obviated by the present invention which provides a novel film loop take-up apparatus which comprises a film cabinet having transparent panels enclosing differentially operable carriage means for adjusting vertically in response to slack of the film loop and a plurality of rollers arranged in sets on each of the carriages over which a length of film loop is trained responsive to film loop slack in a horizontal plane. Motor means are carried on the carriage means for adjusting the spacing between the carriage means for various lengths of film while a three position sensor arm controls the speed of the motor in response to film tension as the film is introduced to the cabinet. Additional film slack sensing means are operably carried on torque motor-driven shafts for controlling the rollers over which the film loop is trained. Means are provided for movably supporting the carriage means which include a pulley and cable system for stabilizing the frame on which the roller means are carried and a chain drive means is employed for moving the carriage means in a differential manner. Therefore, it is among the primary objects of the present invention to provide a novel film loop slack system incorporating means for providing positive demand drive for a continuous film loop as required by the speed of a film printer.

Another object of the present invention is to provide a novel film loop slack compensating apparatus which employs a pair of differentially operating carriages mounting a plurality of rollers over which the film loop is trained and incorporating sensor means so that the film loop is controlled by a positive demand drive in both vertical and horizontal planes.

Another object of the present invention is to provide a film loop apparatus employing a pair of differentially operable carriages mounting a plurality of rollers so that the carriages may be expanded either horizontally or vertically to accommodate more or less film footage and which incorporates a plurality of sensing means for determining film tension and controlling motor means operable to move the carriage means and the rollers carried thereon.

Still a further object of the present invention is to provide a novel film loop slack producing means employing a plurality of low-mass plastic film rollers for transporting a length of film in a film loop in response to rotation of shafts operated by low inertia motors.

Yet another object of the present invention is to provide a novel film loop slack producing device and apparatus which incorporates a pair of film tension slack sensors which function on the presence of slack as opposed to the presence of film tension wherein one of the sensors operates a differentially operating carriage means and the other sensor inputs slack data for adjusting the speed of torque motors controlling a plurality of rollers over which the film loop travels.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

DESCRIPTION OF PREFERRED EMBODIMENTS

Figure 1:
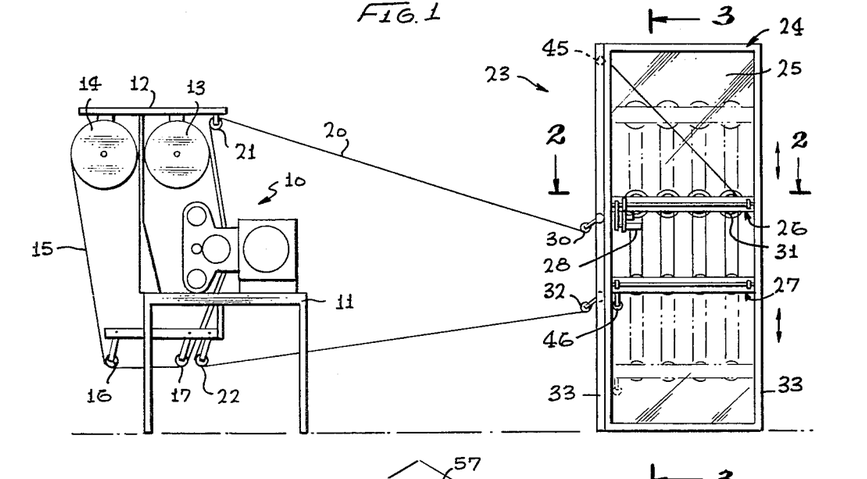
FIG. 1 is a diagramatic side elevational view of the novel film loop apparatus incorporating the present invention.

Referring to FIG. 1, a conventional film duplicator or printer is illustrated in the direction of arrow 10 which is carried on the working surface of a table 11. The table also mounts a reel holder 12 for rotatably carrying a supply reel 13 and a take-up reel 14. A length of film on which a master print is to be duplicated is indicated by numeral 15 and is trained over idler rollers 16 and 17 between the reels 13 and 14. A portion of the film passes through the printer portion of the duplicator or printer 10 in close proximity to a master film, indicated in general by numeral 20 which is trained about idlers 21 and 22 respectively. It is to be understood that the duplicator or printer 10 does not form a part of the present invention and is illustrated only for purposes of utility and clarification. The length of film 20 is formed in an endless loop and the bulk of the film length is stored within the film loop apparatus of the present invention which is illustrated in the general direction of arrow 23.

The film loop apparatus 23 includes a cabinet 24 having transparent panels carried on the sides thereof, as indicated by numeral 25 associated with one side of the cabinet and the bulk of the film length is stored within the enclosure of the panels. The cabinet 24 operably houses a pair of carriages 26, referred to as the upper or top carriage, and 27 referred to as the lower or bottom carriage. The carriages 26 and 27 are movably mounted within the cabinet to move vertically and differentially with respect to each other. Other positions of the carriages are shown in broken lines from the positions shown in solid lines. The carriages are moved within the cabinet by energization of a single electric motor 28 in response to the presence of slack in the continuous loop of film 20. A top sensor 30 feeds a signal voltage to an electronic control system (not shown) when slack is present in the film loop 20 so as to bring together or spread apart the carriages 26 and 27. The sensor 30 is connected to the motor 28 via the electronic control system; however, it is to be understood that the electronic control system may be of any conventional nature and does not form a part of the present invention.

It is to be noted that the upper and lower carriages 26 and 27 carry or mount a plurality of rollers carried on shafts. A roller is indicated by numeral 31 associated with carriage 26. A slack sensor 32 controls the speed of the rollers 31 by means of a torque motor associated with each of the shafts carried on the carriage (to be described later).

Figure 2:
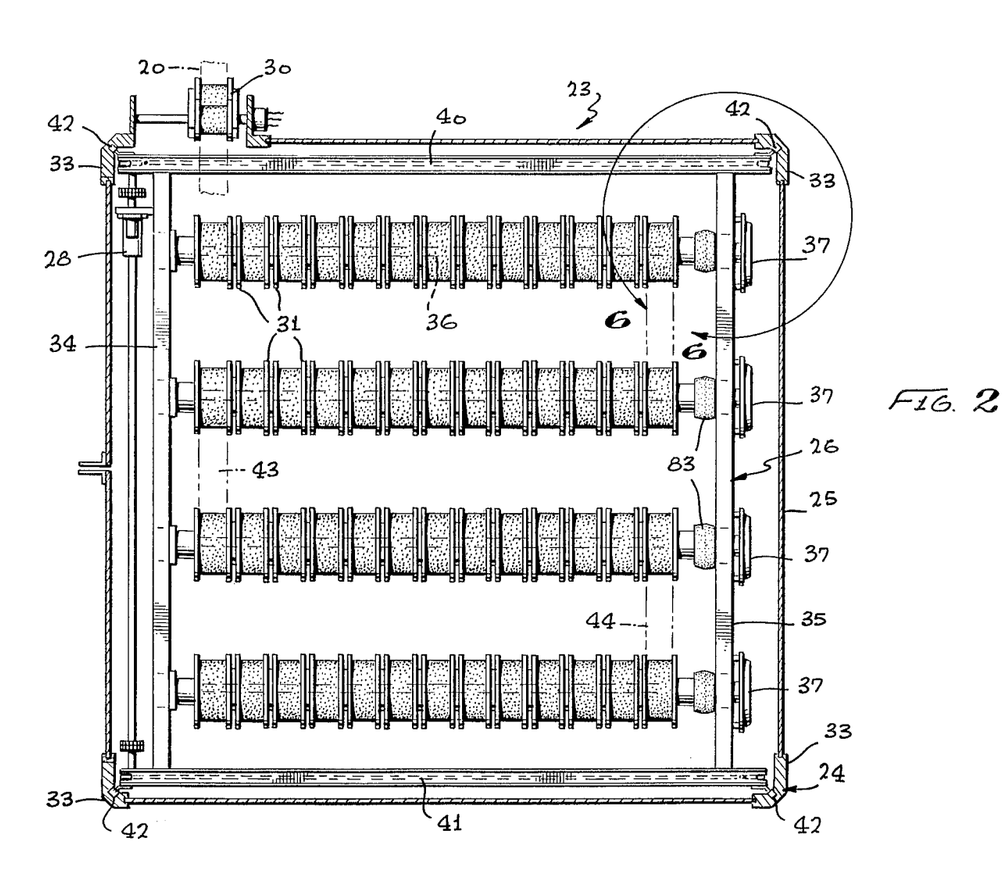
FIG. 2 is a transverse cross-sectional view of the film loop apparatus shown in FIG. 1 as taken in direction of arrows 2—2 thereof.

Referring now to FIG. 2, it can be seen that the cabinet 24 includes extrusions at each corner thereof identified by numeral 33 which not only holds the adjacent ends of the transparent panels so as to enclose the carriages, but provide a track means for rollably supporting the carriages. The top carriage 26 includes a square frame having side pieces 34 and 35 which rollably support a plurality of shafts, such as shaft 36 on which are movably supported, a plurality of film rollers such as the aformentioned roller 31. The shafts are rotated by means of torque motors and torque motor 37 is illustrated in association with shaft 36. The opposite ends of the side pieces 34 and 35 are connected to end rails 40 and 41 respectively. The exposed ends or terminating ends of the end rails are provided with rollers, such as roller 42 associated with extrusion 33 permitting the carriage to be guided and supported during up and down movement thereof in response to energization of motor 28. The film 20 is crossed over the rows of roller set as indicated in dotted lines by numerals 43 and 44 so that a continuous length of film loop is provided.

Figure 3:
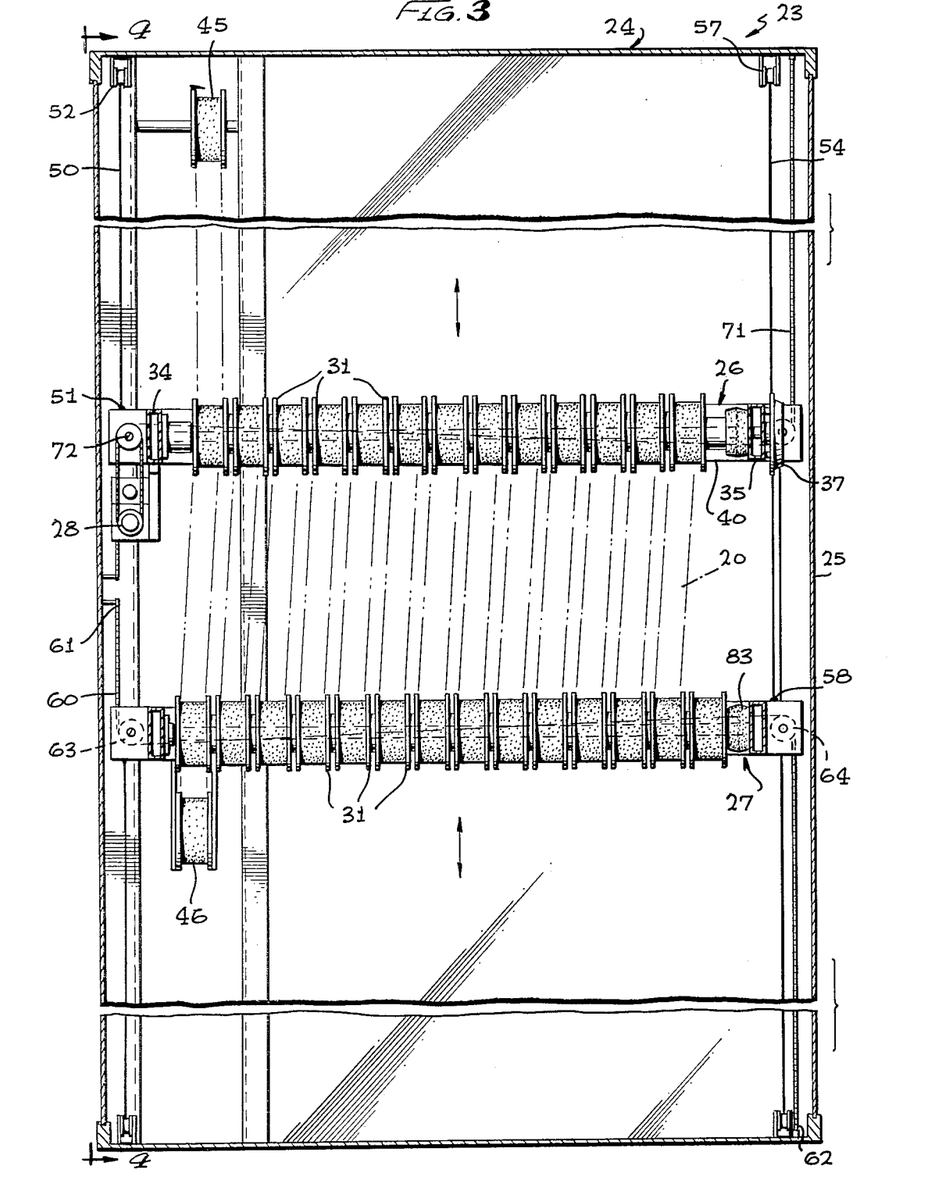
FIG. 3 is a longitudinal cross-sectional view of the film loop apparatus as taken in the direction of arrows 3—3 of FIG. 1.

Referring now in detail to FIG. 3, it can be seen that the film 20 leaves the cabinet via an idler roller 45 having a tachometer attached thereto from one end of the first roller set on the carriage 26. Eventually, the length of film will sequentially and alternately travel between the individual rollers in the various sets of rollers between the upper and lower carriages 26 and 27 respectively and the length of film will enter the cabinet via an idler roller 46 which is carried on the lower carriage 27. The upper idler 45 is fixly attached to the cabinet frame and does not move. Therefore, it can be seen that the top and bottom carriages which mount the roller shafts are not counterweighted and no springs are used. Instead, sensor 30 introduces film slack data into the electronic control system which energizes the carriage drive motor 28 that increases the distance between the upper and lower roller carriages 26 and 27. Conversely, the drive decreases the distance when tension becomes too great.

Figure 4:
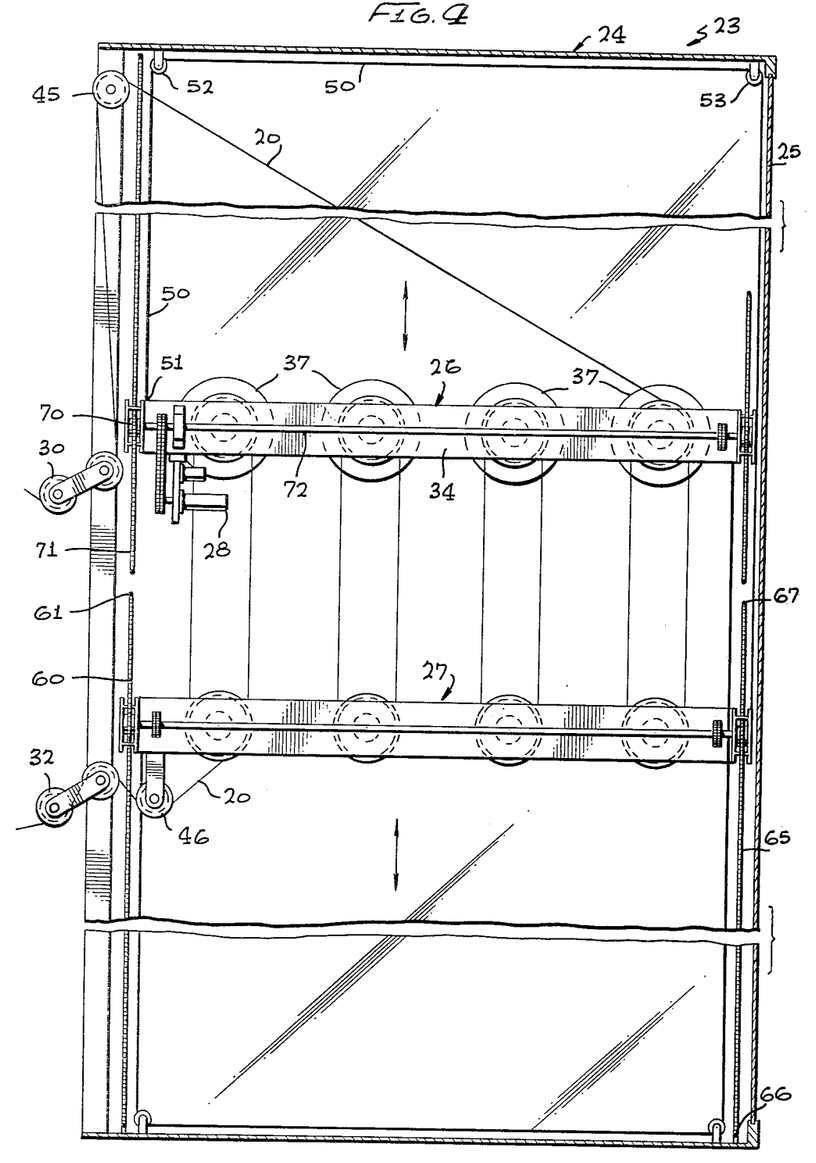
FIG. 4 is a side elevational view of the film loop apparatus as taken in the direction of arrows 4—4 of FIG. 3.

Referring now in detail to FIG. 4, it can be seen that the film 20 is trained over the rollers 31 in each of the roller sets on each carriage. The film 20 rides over the sensor 32 which provides slack data into the electronic control system to adjust the speed of the torque motors 37 associated with each of the roller set shafts. Also, when additional film is loaded into the cabinet and/or when duplicating or printing has commenced, there is a surge of film that creates slack initially in the first roller bank and then progresses through the roller sets or banks until the slack becomes evenly divided among all the loops. Since each shaft is driven by its own torque motor, when slack appears on the first shaft, the first motor speeds up moving the slack in the first set or bank onto the second set or bank where the slack causes that motor to speed up and transfers the slack back to the next bank and so on until all loops are even. The rollers 31 are lightweight plastic and the drive motors are low-inertia torque motors.

In FIGS. 2–4 inclusive, the carriages are stabilized during movement by means of pulleys and cables while the drive for the movement of the carriages is achieved by motor 28 via sprocket and chains. The guiding, stabilization and drive of the carriages are illustrated for clarity in the drawings by showing the lines or cables in solid lines and the chain drive in broken lines. This relationship is more clearly shown diagramatically in FIG. 5.

Figure 5:
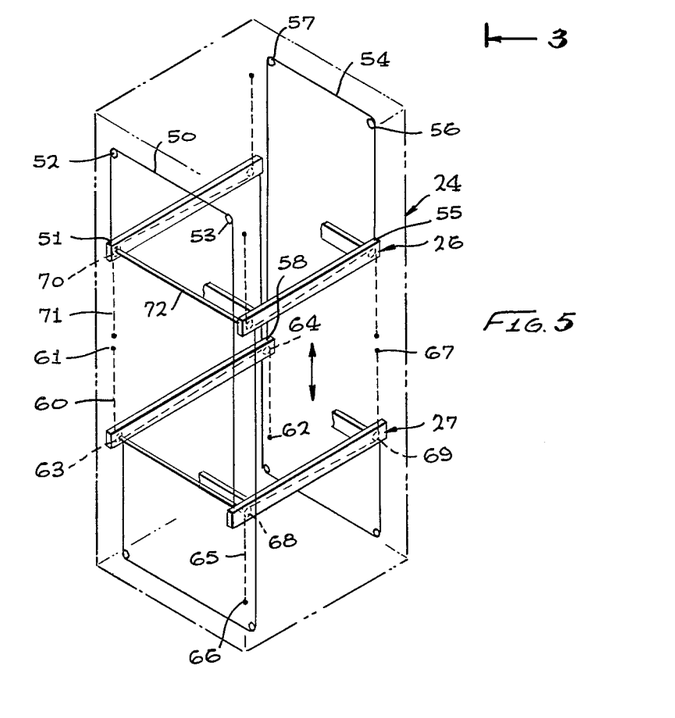
FIG. 5 is a diagramatic perspective view of the cable and chain systems employed in differentially moving the pair of carriages employed in the film loop apparatus.

Referring now in detail to FIG. 5, it can be seen that the cable and associated pulleys are shown in solid lines and that the upper and lower carriages 26 and 27 respectively are interconnected at their end pieces by the cables. For example, a cable 50 is attached to the upper carriage at point 51 and travels over pulleys 52 and 53 to terminate at the end rail of the lower carriage 27. The other side of the carriages are interconnected by similar cabling represented by numeral 54 wherein one end of the cable is attached to the upper carriage at a corner opposite from the corner 51 and indicated by the numeral 55. The cable proceeds over pulleys 56 and 57 to terminate at point 58 on the end rail of the lower carriage. In order to drive the carriages in a differential manner, a sprocket and chain arrangement is similarly provided. For example, a chain 60 associated with the lower carriage 27 terminates at its opposite ends at points 61 and 62 and is trained over sprockets 63 and 64 carried on one of the end rails for the lower carriage 27. The opposite side of the lower carriage is similarly provided with sprocket and chain where the chain is indicated by numeral 65 terminating at point 66 and 67 while the sprockets attached to the other side rail of the lower carriage 27 are indicated by numerals 68 and 69 respectively. The upper carriage 26 is provided with a similar arrangement of chain and sprocket which need not be repeated in description here since it is identical to the system described immediately above. However, a sprocket 70 trained over the chain 71 is powered via shaft 72 and by motor 28 so that power driving of the carriage 26 is provided and carriage 27 merely is slaved or follows along.

Figures 6, 7:
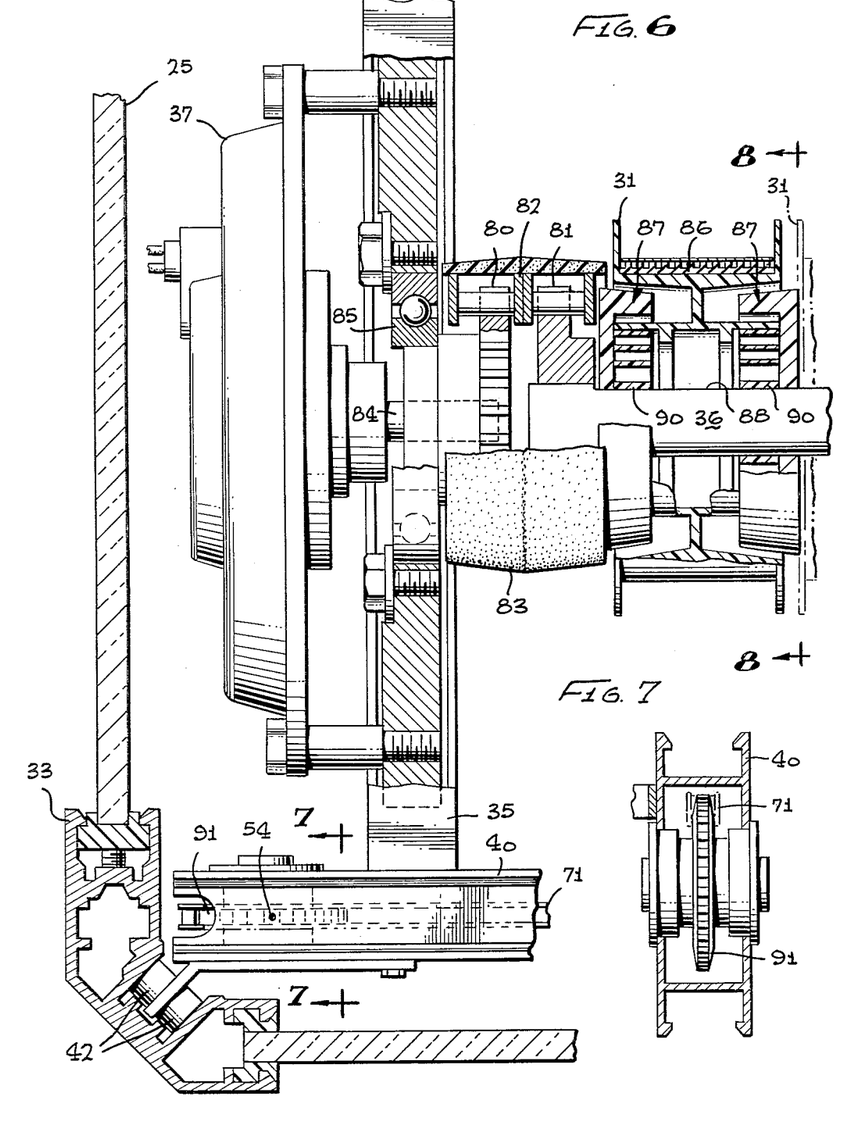
FIG. 6 is a fragmentary, cross-sectional view of a corner of the film loop apparatus as shown between the arrows 6—6 of FIG. 2 and illustrating the positive drive rollers incorporated therein as well as the torque motors therefor.
FIG. 7 is a transverse cross-sectional view of the chain drive and sprocket assembly employed in moving the carriage as taken in the direction of arrows 7—7 of FIG. 6.
Figure 8:
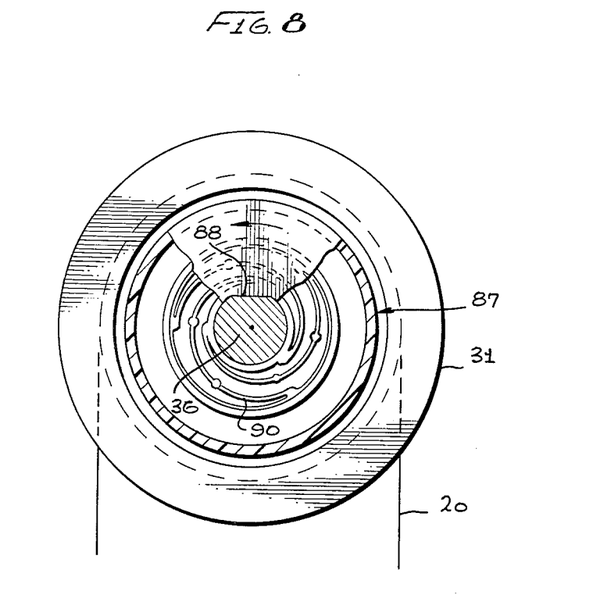
FIG. 8 is a cross-sectional view of a drive roller as taken in the direction of arrows 8—8 of FIG. 6.
Figure 9:
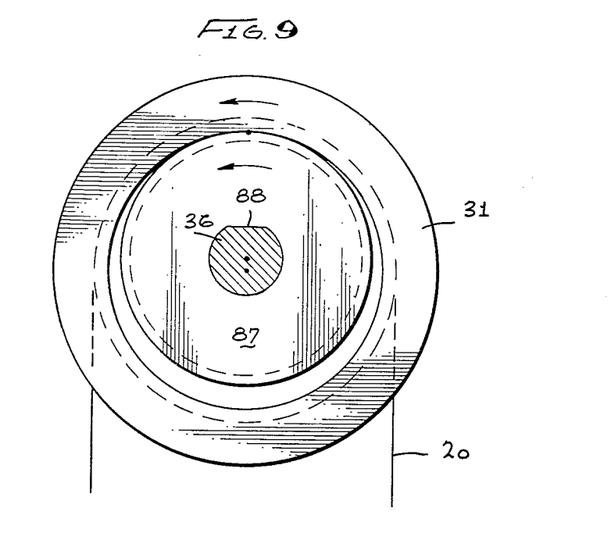
FIG. 9 is a view similar to the view of FIG. 8 illustrating the drive roller in engagement.

Referring now to FIG. 6, it can be seen that the low-inertia torque motor 37 drives shaft 36 by means of sprockets 80 and 81 connected together by tooth coupling 82. A suitable cover 83 is provided for protection of the parts. The driveshaft 84 of the torque motor is mounted in a suitable bearing 85. In FIG. 6, the construction of the demand drive roller system is presented wherein the rollers 31 can act as idlers or drivers depending on the tension requirement at any given instant. Shaft 36 is driven by its torque motor 37. Mounted on the shaft are plastic rollers 31 over which the film 20 passes on a soft silicone tire 86. Inside each roller 31, there is provided a drive puck 87 locked to the driven shaft 36 by mating and corresponding flats identified by numeral 88. The roller is evenly centered about the puck and held in this position by centering springs identified by numeral 90. As shown in FIG. 8, a condition is illustrated wherein the roller 31 is in a no-demand situation while FIG. 9 illustrates how tension on the film deflects the spring 90 and enables the driven puck to engage and turn the roller 31. As can be seen, as the tension is transferred between the conditions, spring 90 is deflected and the roller changes from idler to a driven roller. In turn, drive is applied to each roller along the shaft and from the last roller on that shaft the first roller on the second shaft and so on until all rollers are driven to meet the demand. When the duplicator or printer is shut down, the demand ceases and the opposite condition progressively changes all driven rollers to idlers.

Continuing with reference to FIGS. 6 and 7, it can be seen that the drive chain 71 is trained about a sprocket 91 is carried on the opposite end of the end rail 40 from its end carrying drive sprocket 70. Also, it can be seen that the terminating end of cable 54 is at the end of the end rail 40.

Therefore, it can be seen that the novel film loop apparatus of the present invention provides a means for handling a substantial loop length of film taking into account tension differences of the film as the duplicating or printing proceedure continues. Film to be printed travels out of the cabinet and passes under the carriage adjustment sensor 30. When the printer is not operating, the arm of the sensor is in a midway or no-signal position. When the loop cabinet switch is turned "on", the film becomes taut and the carriage adjusting sensor 30 initiates an immediate electrical signal to close the distance between the carriages 26 and 27 so as to provide film to the printer. Within a fraction of a second, the film becomes slack causing the arm to drop and send a signal to open the distance between the carriages. The sensor arm immediately raises and balance is achieved.

After the film has been duplicated or printed, film 20 in the loop travels back to the cabinet under the sensor 32 identical in appearance to the sensor 30. In the start-up condition, there is slack in the film and the sensor arm is down. In this position, the signal to the roller drive motors 37 calls for maximum speed. As slack decreases, the sensor arm of the sensor 32 swings upward decreasing the speed of the motor 37 until a balance is reached.

If the printer is being operated at relatively high speeds, the tension of the film must be less or there will be a danger of film breakage. This speed-variation condition is automatically compensated for by the electronic controls which provide an extra margin of slack at higher operating speeds.

Also, the spring 90 may be referred to as a spiral-like hub having a base coupled to the flat 88 and an outer rim selectively engagable with the inside diameter of the roller 31.

Controls for the film loop apparatus are mounted on the printer for easy access by the operator. Preferably, three operating modes are provided: A manual-/automatic mode, and automatic run mode, and a manual load mode. The manual load mode is useful for loading as the film is jogged by the operator for fast loading.

Preferably, the cabinet is fabricated of an extruded aluminum framework that is assembled by wedgetype fittings that lock individual frame members together. The interior of the cabinet is always visible to the operator via the transparent panels so that the operator can view the film 20. Access to the interior is through a folding door and the basic module or cabinet accommodates up to 500 feet of film of the 35 mm type. 16 mm film can be transported over the same rollers as the 35 mm film. If only 16 mm film is to be used, the 35 mm roller shafts can be interchanged in a few minutes with 16 mm roller shafts. Twice the amount of 16 mm film can then be accommodated in the same cabinet as compared to the amount of 16 mm film that the cabinet will hold with 35 mm rollers.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. Film loop apparatus for controlling the tension of a length of continuous film formed in an endless loop comprising the combination of:
   a framework enclosing a portion of the film length therein;
   carriage means movably mounted on said framework for supporting said portion of film length within said framework;
   roller means movably supporting said portion of film length on said carriage means;
   first sensor means carried on said framework and engagable with said portion of film length operable in response to a first slack condition to move said carriage means so as to remove said first slack condition; and
   second sensor means carried on said framework and engagable with said portion of film length operable to drive said roller means in response to a second slack condition so as to remove slack not removed when sensed by said first sensor means.

2. The invention as defined by claim 1 wherein:
   said carriage means includes a pair of carriages arranged parallel to each other; and
   control means operably interconnecting said pair of carriages together for differentially moving said carriages on said framework in response to said first condition film slack.

3. The invention as defined in claim 2 wherein:
   each of said carriages of said pair includes a frame having parallel side members and parallel end rail wherein adjacent terminating ends of said rails and members are coupled together;
   rollers carried on each of said carriage frames; and
   said framework encludes guide tracks insertably and rollably receiving said carriage rollers so as to allow movement of said carriages respectively on said framework.

4. The invention as defined in claim 3 wherein:
   said roller means includes a plurality of shafts rotatably carried between said parallel side members;
   a plurality of rollers mounted side-by-side on each of siad shafts over which said portion of film length is trained; and
   a torque motor operably connected to each of said shafts for controlling the speed of shaft rotation in response to said second sensor means.

5. The invention as defined in claim 4 wherein:
   said roller means includes a rigid connection coupling each of said rollers with its associated shaft; and
   resilient means serving as a hub for each roller mounting to said shaft selectively responsive to the speed of said shaft rotation to effect engagement and disengagement of said roller with said portion of film length.

6. The invention as defined in claim 5 wherein:
   said control means includes drive means interconnecting said pair of carriages with said framework for differentially moving said carriages towards and away from each other in response to said first sensor means.

7. The invention as defined in claim 6 wherein:
   said drive means includes a chain and sprocket assembly;
   a drive motor mounted on a selected one of said pair of carriages operably coupled to said chain and sprocket assembly for forcibly moving said pair of carriages thereby; and
   a cable and pulley assembly interconnecting said pair of carriages to said framework cooperating with said chain and sprocket assembly to stabilize said carriages as they differentially move on said framework.

8. The invention as defined in claim 7 wherein:
   said framework constitutes a cabinet having transparent panels enclosing said carriages, control means and said roller means.

9. In a film printer for duplicating images from a master film onto a duplicate film, the improvement which comprises:
   a film loop apparatus for storing and transporting a continuous, endless loop of said master film;
   said apparatus includes a framework enclosing a pair of carriages mounted for differential movement with respect to each other on said framework;
   first sensor means carried on said framework and operably coupled to said carriages for moving said carriages in accordance with a slack condition in said film loop;
   roller means carried on each of said carriages about which said film loop is trained;
   second sensor means operably coupled to said roller means for tensioning said film loop in response to film slack other than film loop slack compensated for by said first sensor means.

10. The invention as defined in claim 9 wherein:
    said first sensor means includes a sensor coupled to said film loop upon leaving said apparatus and a drive means interconnecting said carriage means to said framework;
    said carriage means comprising a pair of carriages differentially movable on said framework in response to said drive means.

11. The invention as defined in claim 10 wherein:
    said roller means includes a plurality of shafts rotatably carried on each of said carriages and a plurality of rollers selectively rotatably mounted on each of said shafts in side-by-side relationship;
    said second sensor means includes a sensor engagable with said film loop as it enters said apparatus;
    torque motor drive carried on each of said carriages operably coupled to each of said shafts for controlling the speed thereof in response said second sensor; and
    resilient means interconnecting each roller with its associated shaft to frictionally engage and disengage said roller with said film loop in response to the speed of said associated shaft.

* * * * *